United States Patent

[11] 3,602,808

[72] Inventor James L. Kirkland
 Panama City, Fla.
[21] Appl. No. 853,003
[22] Filed Aug. 26, 1969
[45] Patented Aug. 31, 1971
[73] Assignee The United States of America as represented by the Secretary of the Navy

[54] PULSE MAGNETOMETER USING A COIL EXPANDED BY AN EXPLOSIVE
11 Claims, 10 Drawing Figs.
[52] U.S. Cl. .................................................. 324/47,
 336/20, 340/195, 89/8
[51] Int. Cl. ...................................................... G01r 33/02
[50] Field of Search ........................................... 324/43, 47;
 340/192, 195; 89/8; 336/20

[56] References Cited
UNITED STATES PATENTS
2,649,573 8/1953 Goldberg et al. .............. 324/71
3,113,272 12/1963 Cannon et al. ................. 328/1

Primary Examiner—Rudolph V. Rolinec
Assistant Examiner—R. J. Corcoran
Attorneys—Louis A. Miller, Don D. Doty and William T. Skeer ABSTRACT: A collapsed coil of conductive wire is expanded within an ambient magnetic field with explosive suddenness. The change of area enclosed by the coil within the ambient field causes an electric current to be generated therein. Through appropriate telemetry techniques the electric current is transmitted to a remote station as indicative of the strength of the magnetic field at the position of the coil. Other utilization devices other than the telemetry link may serve as a load for the coil.

James L. Kirkland
INVENTOR.

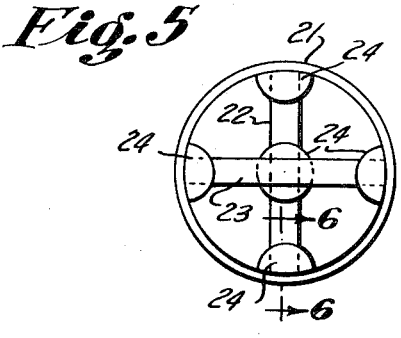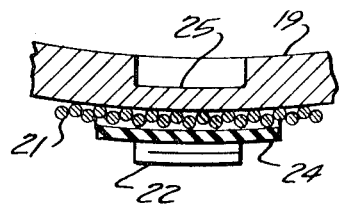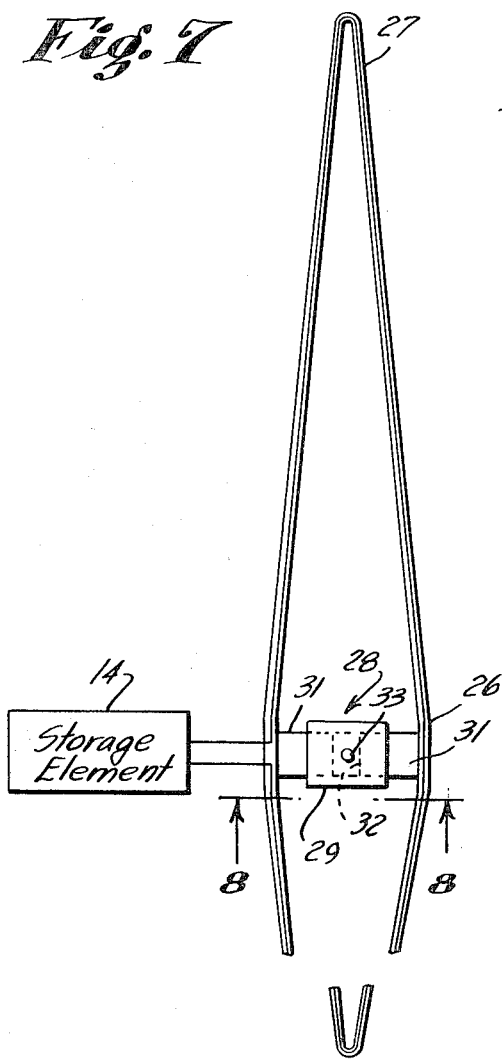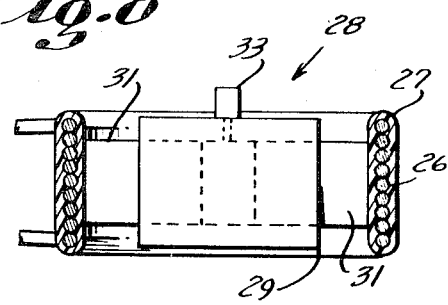
James L. Kirkland
INVENTOR.

James L. Kirkland
INVENTOR.

PULSE MAGNETOMETER USING A COIL EXPANDED BY AN EXPLOSIVE

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

This invention relates to electromechanical transducers. More particularly, this invention relates to impulse-type magnetometers. Further, the invention pertains to an instrument in which a coil of wire is expanded with explosive suddenness at a location at which it is desired to measure or to detect the presence of a magnetic field. This location may be remote from the earth, such as a remote planet or other astronomical body. In such instances, the results of the measurement are returned to earth by a suitable telemetry link.

In the past, remote magnetometer readings have been obtained by employing transducers utilizing spinning or oscillating loops of wire. While satisfactory in certain applications, these devices require a separate source of power to sustain the movement of the sensing conductor loop. Such arrangements are, of course, cumbersome and do not lend themselves to remote measurements.

It should also be noted that transducers of the type of the invention have utility as pulse generators. Such applications as the generation of X-ray tube supply potentials and high voltage pulses for use in testing apparatus are subject to utilizing this invention as an energy supply circuit. In such instances, the device is used with an artificially produced high density magnetic field, such as between the pole pieces of a permanent magnet, for example. However, the invention will be described and best understood as it pertains to a remote pulse type magnetometer.

SUMMARY OF THE INVENTION

In the device of the invention, a length of wire or other telemetry conductor material is compactly coiled about an explosive filled propellant unit. The coil may include one or a plurality of conductors depending on whether or not the telemetry load is more responsive to current or voltage. The electrical circuit of the loop is connected to a suitable electrical circuit load element, such as a capacitor, a plating-type light valve, or other suitable electronic storage element. The coil is suddenly opened up to its full extent by the propellant in the presence of the magnetic field to be measured and in so opening the area enclosed by the coil is caused to change. An electrical current is induced in the coil in accordance with known electrophysical relationships.

With the foregoing material in mind, this invention has as its primary object the provision of a new electromechanical transducer and, of course, additionally embraces the individual novel components thereof and the improved method of measurement made possible thereby.

A further object of this invention is the provision of an electromechanical transducer using a collapsed coil of wire as a sensing element.

Another object of this invention is to provide an improved method and means for detecting a magnetic field.

A further object of this invention is to provide an improved method and means for generating a rapid-rise-rapid-fall voltage signal.

A further object of the invention is the provision of an improved novel pulse-type magnetometer.

Another object of this invention is the provision of a pulse-type magnetometer using a coil sensor with increasing area.

A still further object of this invention is the provision of a magnetometer system for making measurements of magnetic fields at remote locations.

Other objects and many of the attendant advantages will be readily appreciated as the subject invention becomes better understood by reference to the following detailed description, when considered in conjunction with the accompanying drawings.

BRIEF DESCRIPTION OF THE DRAWINGS

FIG. 5 is an illustration of an embodiment to make three measurements with a single unit;

FIG. 6 is a sectional view taken along line 6—6 of FIG. 5;

FIG. 7 illustrates a configuration, with parts broken away, of the device of the invention useful in applications requiring a multiturn single loop coil;

FIG. 8 is a sectional view taken along lines 8—8 of FIG. 7;

DESCRIPTION OF THE PREFERRED EMBODIMENT

Figure 1:
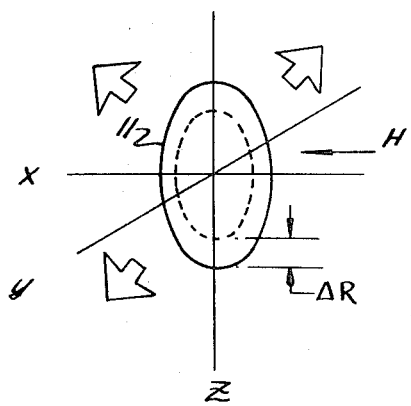
FIG. 1 is an illustration useful in explanation of the theory of operation.

Referring to FIG. 1, it is seen that a coil 11 of wire is shown at right angles to a magnetic field indicated by the vector H. If coil 11 is expanded within its plane, an electrical current will, be induced therein. Such an expansion may be visualized as a movement of coil 11 from the position indicated by the broken line to the solid line position illustrated in FIG. 1. This movement is illustrated schematically by the hollow arrows.

As shown, such an expansion of the coil within a plane effectively changes the radius of the coil, as indicated on the illustration by the expression $\Delta R$. It is clear that such a change in coil 11's configuration results in a change in the area enclosed thereby. Since coil 11 is in a magnetic field, the increase of area of the coil changes the amount of magnetic flux cut and enclosed thereby. As will be readily perceived by those versed in the electrical arts, an electrical current will be induced in the wire of a magnitude which is a function of a known relationship between the strength of the magnetic field and the time rate of change of the area of coil 11.

The induced current may be measured by conventional techniques as indicative of the strength of the magnetic field. In order to make this measurement technique feasible, coil 11 must expand suddenly in such a fashion as to increase its area many fold, and do so without breaking.

As may be readily appreciated, there is a finite limit to the ability of a single wire to stretch so as to increase the area of a loop formed therefrom. Applicant has devised an arrangement whereby a single loop may be formed of a tightly coiled and compressed conductor which will allow said loop to alter its area several fold before its elastic limit is reached.

Figure 2:
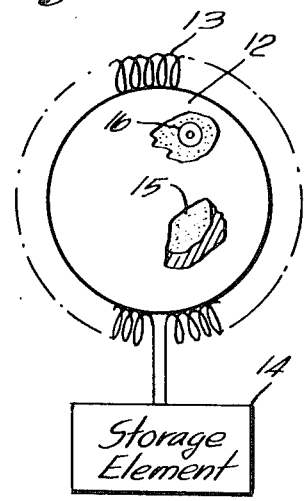
FIG. 2 is an illustration of one form of the invention, including a schematic showing of the connection to an electronic storage element.

Referring to FIG. 2, a spherical propellent unit 12 is encircled with a compacted coil 13, shown somewhat distended for purposes of illustration. Coil 13 is made of a suitable low resistance conductor material which holds its shape when compactly coiled but is flexible enough and strong enough to permit rapid uncoiling without breaking. Several alloys of copper and silver are available to meet these requirements, but it should be understood that other conductor materials may be employed as metallurgical experience indicates their suitability for this application.

As shown, an electrical storage element 14 is connected in circuit with coil 13. The precise nature of storage element 14 is dictated by the type of telemetry circuitry that it is desired to employ. Such elements as capacitors, plating-type light valves, and other similar integrating storage devices are contemplated as dictated by the choice of telemetering arrangement. A capacitor has been used with good success in developmental studies.

Propellent unit 12 encloses a suitable explosive mixture 15. Timely ignition of explosive mixture 15 is effected by means of a detonator 16. Explosive mixture 15 may be of any suitable type, but for use in rare atmospheres or outer space it should be of the type which contains its own oxidant. Detonator 16 is likewise of a conventional type and may be either of the electrically fired or percussion type.

The body portion of propellent unit 12 may be made of any suitable frangible material. The primary consideration in the choice of body material selection is compatibility with coil 13. That is, the body portion should fragment into small pieces having low mass so as not to harm coil 13. Papermache and certain plastic and ceramic materials will satisfy these requirements and the fabrication techniques thereof are known to persons versed in the pyrotechnic arts.

The foregoing discussion has assumed that the expanding measuring conductor loop will be at right angles to the direction of the magnetic field. As is well known to persons versed in magnetic measurements, such an ideal orientation is difficult to achieve. However, if simultaneous measurements are taken in three mutually perpendicular planes the total field strength may be determined by conventional techniques.

Figure 3:
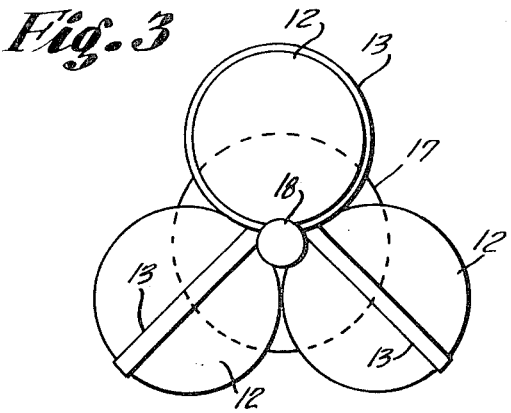
FIGS. 3 and 4 are enclosed side elevations, respectively, and illustrate how the device of the invention may be configured to obtain magnetic field readings in three coordinates.
Figure 4:
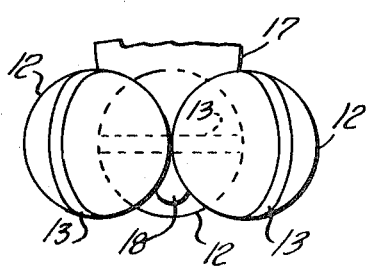

FIGS. 3 and 4 illustrate how three of the devices according to he invention may be combined to make the measurement in three planes simultaneously. It should be noted that the three units are attached to a common support 17 having a nose portion 18 protruding beyond the propellent units 12 to lend stabilizing support thereto. Support 17 may be a component part of the delivery vehicle, if desired, and may house the telemetry circuitry associated with the device if desired. The detonators of the three propellent units 12 are fired simultaneously by command circuitry within housing 17.

FIG. 5 illustrates how a single propellent unit 19 may support measuring coils 21, 22, and 23 to define three measuring planes. In order to prevent interaction of the individual coils with one another, insulating members 24, which may be small pieces of an insulating sheet plastic, are placed therebetween at their points of intersection. To ensure a reasonable uniformity of coil expansion rate between coils 21, 22, and 23, the walls of propellent unit 19 may have thinned portions 25 at the points of intersection of the coils, as shown in FIG. 6. This construction provides a uniform inertial resistance to the expansion of gases from the interior or of propellent unit 19, when it is detonated.

In some applications a maximum induced voltage is desired as a measuring parameter. A plural-turn loop in such instances is the optimum way that an increased voltage may be generated. When used with omnidirectionally expanding propellent units, however, it is difficult to ensure that the individual turns of the sensing coil will remain in one plane. It has been determined that for such applications a bidirectional propellent unit may be used to expand a sensing coil having a polygonal configuration which has been collapsed to form a substantially linear arrangement.

Referring to FIGS. 7 and 8, it may be seen that sensing coil 26, which is connected in circuit with storage element 14, comprises a six-turn loop which is constructed so as to form a closed polygonally shaped configuration. The individual turns of coil 26 may be secured together by a lightweight plastic binder 27 to provide electrical insulation between adjacent turns thereof and to improve the rigidity of the individual arms of the polygon. The binder 27 may be thinned or omitted at the corners to improve flexibility at those points providing the adjacent turns are isolated one from the other. The connection to the storage element may be made of tightly coiled conductors, as used in coils 13, 21, 22, and 23, Coil 26 is then collapsed along one diagonal to form a substantially linear configuration.

Figure 9:
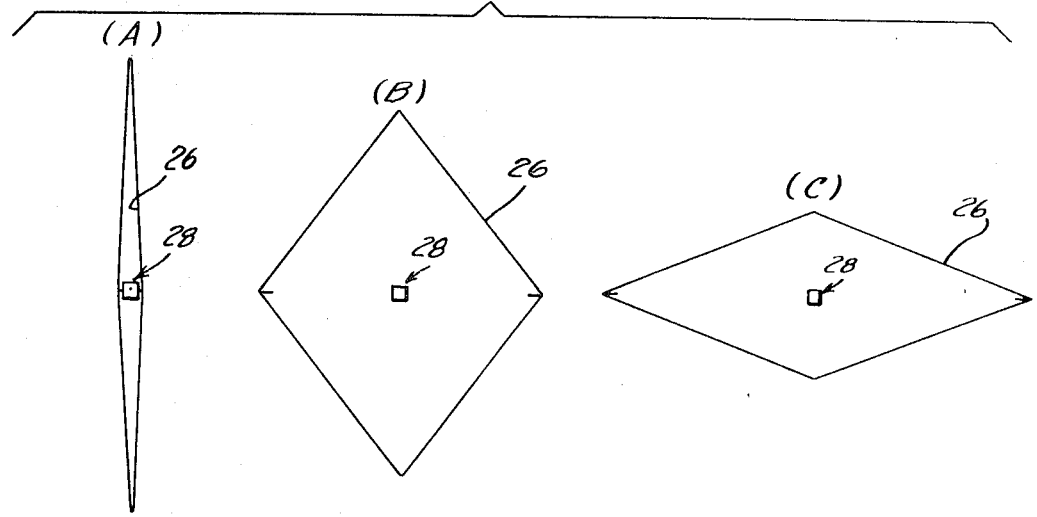
FIG. 9 illustrates three stages in the operation of the device of FIG. 7.

The propellent unit 28 used to expand coil 26 comprises a cylindrical body 29 with open ends. Cylindrical plugs 31, which may be made of frangible material, as used in the construction of the body portion of propellent unit 12, are fitted into the opposite open ends of cylindrical body 29 to define a confined space 32. Like the interior of propellent unit 12, space 32 is filled with an explosive mixture. Detonator 33 ignites the explosive mixture within space 32 to drive the plugs 31 outwardly. As the plugs 31 travel in opposite directions, the polygon is expanded and collapsed again along an opposite diagonal, as illustrated in FIGS. 9A, B, and C. The resulting alternation of area produces a similar inductive action with respect to any ambient magnetic field that may be present, as previously noted in discussion of FIG. 2.

Coil 26 may, of course, contain more than the six terms shown and described. In developmental models, 50 turns have been used to good effect. Similarly, coil 26 is shown partially opened in FIG. 7 but, in practice, the adjacent sides of the polygon may be collapsed completely. To facilitate electrical connection thereto, it may be desirable to open and collapse coil 26 about the intersection point of two adjacent sides. Such an operation may be readily achieved with a modification of propellent unit 28. In such instances, cylinder 29 may be open on but a single end and expand one pair of sides with the closed end thereof, while a single plug 31 may operate against the opposite sides. Similarly, propellent unit 28 may be of the frangible sphere type with a thinned portion, such as thinned portion 25, extending circumferentially therebout.

MODE OF Operation

The device of the invention may be used with any of several types of telemetering systems. For purposes of explanation the operation of the device will be explained with reference to a simple command and respond system.

Figure 10:
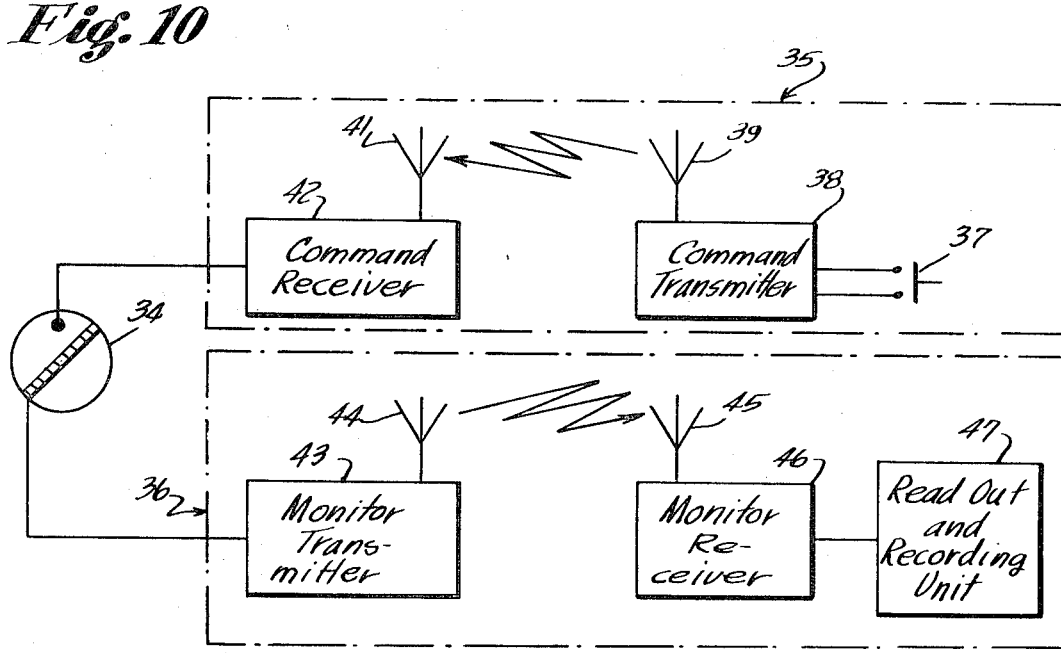
FIG. 10 is a diagrammatic showing of a telemetry system enabling the device of the invention to be used in remote locations.

Referring to FIG. 10, transducer 34, which may be any of the aforedescribed arrangements of coil and propellent unit, is fired by a command link 35. The induced electrical potential in the coil thereof is returned via telemeter link 36.

As will be readily appreciated, the function of command link 35 is straightforward. Depressing key 37 causes command transmitter 38 to broadcast, via antenna 39, a command signal. Receiving antenna 41 receives the command signal and feeds it to command receiver 42. Upon receipt of the command signal, command receiver fires the explosive mixture in the propellent unit of transducer 34.

Transducer 34, which, as previously noted, may be any of the aforementioned types, detects the ambient magnetic field by expanding the area enclosed by a collapsed coil carried thereby. The electrical current or voltage induced in the coil expansion thereof is fed to a monitor transmitter 43, a component of telemeter link 36. This signal, which is indicative of the magnetic field at the point of firing, is broadcast by monitor transmitter 43 via antenna 44.

The signal broadcast by antenna 44 is received by antenna 45 and fed therefrom to receiver 46. The signal is fed from receiver 46 to a readout and recording unit 47 which is calibrated to indicate the field strength of the ambient magnetic field at the location of transducer 34.

If desired, command link 35 may be replaced by a condition responsive actuated circuit designed to fire transducer 34 in response to the approach thereof to a planet or other object about which a magnetic field measurement is desired. Similarly, a timer mechanism might be used to actuate transducer 34.

From the foregoing description, taken together with the accompanying claims and drawings, it is seen that Applicant has disclosed a new and useful device and method for making magnetic measurements which would be unobvious to a person skilled in the pertinent arts not having the benefit of the instant disclosure, but which may be made and used by such a person having the benefit of said disclosure. Further, it is similarly clear and obvious that the invention meets the objects of invention above outlined and constitutes a meritorious advance in the instrumentation arts.

What is claimed is:

1. An electromagnetic transducer comprising in combination:
   propellent unit means;
   conductive coil means collapsed about said propellent unit means for support thereby;
   storage means connected to said conductive coil means for recording the electrical current induced therein;
   explosive means filling the interior of said propellent unit means for expansion of said conductive coil means; and
   detonating means mounted on said propellent unit means in cooperative relationship with said explosive means for the timely ignition thereof, so as to initiate the expansion of said conductive coil means.

2. An electromagnetic transducer according to claim 1 in which said propellent unit means comprises a spherical body portion made of a frangible material.

3. An electromagnetic transducer according to claim 1 in which said propellent unit comprises body portion made of a lightweight frangible material having a thinned portion for imparting predetermined separation characteristics thereto.

4. An electromagnetic transducer according to claim 1 in which said propellent unit means comprises three identical spherical body portions made of a frangible material supported on a common support means.

5. An electromagnetic transducer according to claim 1 in which said conductive coil means comprises three coils supported in mutually orthogonal planes by said propellent means.

6. An electromagnetic transducer means according to claim 1 in which said conductive coil means comprises a polygonal coil which is collapsed along one diagonal thereof about said propellent unit to be supported thereby in a linear configuration.

7. An electromagnetic transducer according to claim 1 further characterized by a readout effectively connected to the output of said storage means.

8. An electromagnetic transducer according to claim 1 further comprising:
   a command link connected to said detonating means for initiating the detonation thereof from a point remote therefrom.

9. An electromagnetic transducer according to claim 8 in which said command link comprises:
   an electromagnetic transmitter means located at said remote point;
   first antenna means connected to said electromagnetic transmitter means for broadcast of command signals therefrom;
   receiver means connected to said detonating means for initiating the firing thereof in response to the receipt of said command signals; and
   second antenna means connected to said receiver means for transmission thereto the portion of said command signals broadcast from said first antenna which impinges thereon.

10. An electromagnetic transducer according to claim 1 further comprising:
    a telemetry link connected to said storage means for monitoring the currents stored therein from a point remote therefrom.

11. An electromagnetic transducer according to claim 10 wherein said telemetry link comprises:
    monitor transmitter means connected to said storage means for generation of a signal having predetermined characteristics in response to the electrical currents recorded thereby;
    first monitor antenna means connected to said monitor transmitter means for broadcast of signals generated thereby;
    second monitor antenna means located at said remote point for receipt of said monitor signals;
    monitor receiver means connected to said second monitor antenna means for receipt of sad monitor signals; and
    readout means connected to said monitor receiver for providing an indication at said remote of the current induced in said conductive coil means.